(12) United States Patent
Bull et al.

(10) Patent No.: US 7,979,642 B2
(45) Date of Patent: Jul. 12, 2011

(54) MANAGING THE STORAGE OF HIGH-PRIORITY STORAGE ITEMS IN STORAGE UNITS IN MULTI-CORE AND MULTI-THREADED SYSTEMS USING HISTORY STORAGE AND CONTROL CIRCUITRY

(75) Inventors: David Michael Bull, Cambridge (GB); Emre Özer, Cambridge (GB)

(73) Assignee: ARM Limited, Cambridge (GB)

( * ) Notice: Subject to any disclaimer, the term of this patent is extended or adjusted under 35 U.S.C. 154(b) by 401 days.

(21) Appl. No.: 12/232,188

(22) Filed: Sep. 11, 2008

(65) Prior Publication Data
US 2010/0064109 A1 Mar. 11, 2010

(51) Int. Cl.
*G06F 13/00* (2006.01)
(52) U.S. Cl. ........ 711/133; 712/220; 712/225; 712/240; 711/135; 711/137; 711/144; 711/145; 711/151; 711/156; 711/158; 711/159; 711/165; 718/103
(58) Field of Classification Search .................. 711/133, 711/135, 137, 144, 145, 151, 156, 158, 159, 711/165; 712/240, 220, 225; 718/103
See application file for complete search history.

(56) References Cited

U.S. PATENT DOCUMENTS
2007/0150655 A1* 6/2007 Nakasato ................ 711/125
2008/0263341 A1* 10/2008 Ozer et al. ............... 712/239
2008/0295105 A1* 11/2008 Ozer et al. ............... 718/103

OTHER PUBLICATIONS

S. E, Raasch et al, "Applications of Thread Prioritization in SMT Processors" Proceedings of Multithreaded Execution, Architecture and Compilation Workshop, Jan. 1999, pp. 1-9.
G. K. Dorai et al, "Transparent Threads: Resource Sharing in SMT Processors for High Single-Thread Performance" Proceedings of the 11th Annual International Conference on Parallel Architectures and Compilation Techniques, Sep. 2002.

* cited by examiner

*Primary Examiner* — Hong Kim
(74) *Attorney, Agent, or Firm* — Nixon & Vanderhye P.C.

(57) ABSTRACT

A data processing apparatus is provided comprising processing circuitry for executing multiple program threads. At least one storage unit is shared between the multiple program threads and comprises multiple entries, each entry for storing a storage item either associated with a high priority program thread or a lower priority program thread. A history storage for retaining a history field for each of a plurality of blocks of the storage unit is also provided. On detection of a high priority storage item being evicted from the storage unit as a result of allocation to that entry of a lower priority storage item, the history field for the block containing that entry is populated with an indication of the evicted high priority storage item. When later a high priority storage item is allocated to a selected entry of the storage unit, a comparison operation between the allocated high priority storage item and the indication in the history field for the block containing the selected entry is carried out, and on detection of a match condition a lock indication associated with that entry is set to inhibit further eviction of that high priority storage item.

22 Claims, 14 Drawing Sheets

MANAGING THE STORAGE OF HIGH-PRIORITY STORAGE ITEMS IN STORAGE UNITS IN MULTI-CORE AND MULTI-THREADED SYSTEMS USING HISTORY STORAGE AND CONTROL CIRCUITRY

BACKGROUND OF THE INVENTION

1. Field of the Invention

The present invention relates to techniques for managing shared storage units in a data processing apparatus, for example shared associative tables in multi-core and multi-threaded systems.

2. Description of the Prior Art

It is known for a storage unit such as a cache, translation lookaside buffer (TLB) or branch target buffer (BTB), to be shared by more than one thread being executed by processing circuitry in a data processing apparatus (i.e. the processing circuitry supports more than one hardware thread context). The multiple program threads may comprise separate applications, or may instead comprise different processes within an individual application that are allowed to execute in parallel. One type of processing circuitry that can execute multiple program threads is often referred to as a multi-threaded processor and such multi-threaded processors can take a variety of forms. One example of such a multi-threaded processor is a simultaneous multi-threaded (SMT) processor where the processor can issue operations for multiple different threads at the same time, one particular example being an asymmetric multi-threaded processor. In alternative embodiments, the processing circuitry may comprise multiple separate processor cores (a multi-core system), for example a heterogeneous multi-core system.

In such multi-threaded systems it is further known that some threads have higher priority than others. For example, a thread relating to a task being carried out by the processor or system which is time critical may be designated as high priority, such that when this thread competes with other lower priority threads for the resources of the processor or system, the high priority thread is given precedence.

Asymmetric SMT cores where there is one high priority thread and one lower priority thread in the system are discussed in "Applications of Thread Prioritization in SMT Processors", S. E. Raasch and S. K. Reinhardt, Proceedings of Multithreaded Execution, Architecture and Compilation Workshop, January 1999, and in "Transparent Threads: Resource Sharing in SMT Processors for High Single-Thread Performance", G. K. Dorai and D. Yeung, Proceedings of the 2002 International Conference on Parallel Architectures and Compilation Techniques.

There are various situations in such a system where threads may compete for resources, but of particular relevance here is a shared storage unit (also referred to herein as a shared table). Taking the example of a shared cache, the system may be arranged so that, for example, entries made in the cache by lower priority threads can be caused to be evicted by the allocation of entries from high priority threads, but not vice versa. However, whilst this strict preferential treatment for the high priority threads may, in some situations, be appropriate and desirable, in other situations this approach may be too inflexible resulting in poorer overall system performance than might otherwise be achievable.

Hence, it would be desirable to provide an improved technique for managing a shared table, where that table is shared by multiple threads at least one of which has higher priority than the others.

SUMMARY OF THE INVENTION

Viewed from a first aspect, the present invention provides a data processing apparatus comprising: processing circuitry for executing multiple program threads including at least one high priority program thread and at least one lower priority program thread; at least one storage unit shared between the multiple program threads and comprising multiple entries, each entry for storing a storage item for reference by the processing circuitry when executing said program threads, each storage item being either a high priority storage item associated with said at least one high priority program thread or a lower priority storage item associated with said at least one lower priority program thread; history storage for retaining a history field for each of a plurality of blocks of the storage unit, each block comprising one or more of said entries; and control circuitry for, on detection of an evicted high priority storage item being evicted from an entry of the storage unit as a result of allocation to that entry of an allocated lower priority storage item, populating the history field for the block containing that entry with an indication of the evicted high priority storage item, and the control circuitry being further for performing, when an allocated high priority storage item is allocated to a selected entry of the storage unit, a comparison operation between the allocated high priority storage item and the indication in the history field for the block containing the selected entry, and on detection of a match condition said control circuitry setting a lock indication associated with said selected entry to inhibit further eviction of said allocated high priority storage item.

The inventors of the present invention realised that the cost to the lower priority threads of always prioritising the high priority threads in the usage of a shared table could in some situations lead to an undesirable performance loss for the lower priority threads. This is because the policy of always giving precedence to the high priority thread(s) may lead to the lower priority threads hardly being able to utilise the shared table, as a result of which long delays may be incurred accessing required data in memory. In particular, the inventors of the present invention observed that not every high priority thread entry in the table will be needed again by the processor, and so could be evicted without impacting on the performance of the high priority thread.

Hence, according to the present invention there is provided history storage for retaining a history field for each of a plurality of blocks of a storage unit. Initially a storage item caused to be stored in the storage unit by a high priority thread is stored without populating the history field. However, on detection of a high priority storage item being evicted from an entry of the storage unit as a result of allocation to that entry of a lower priority storage item, the history field corresponding to that entry is populated with an indication of the evicted high priority storage item. Then later when the high priority thread causes a storage item to be allocated to that entry of the storage unit the incoming storage item is compared to the indication in the history field corresponding to that entry. If this comparison results in a match condition then the control circuitry sets a lock indication associated with this entry to inhibit further eviction of this high priority storage item.

By this mechanism a storage item stored in the storage unit by a high priority thread is allowed to be evicted once by the allocation of a storage item for a lower lower priority thread, but if that high priority storage item then returns to the storage unit a lock indication is set to inhibit further eviction of the high priority storage item.

It will be appreciated by those skilled in the art that such a data processing apparatus could keep track of the relative priorities of the storage items stored in the entries of the storage unit in a variety of ways, but in one embodiment the storage unit has a priority indication associated with each entry, for each entry the priority indication indicating whether the storage item in that entry is a high priority storage item or a lower priority storage item. Thus, by the simple mechanism of referencing this priority indication the relative priority of each storage item stored in the storage unit can be ascertained.

It will be recognised that the lock indication could be stored in a variety of ways. In one embodiment there is provided a lock indication storage unit for storing the lock indication associated with each entry. This lock indication storage unit could take the form of a physically separate component from the storage unit or alternatively could be an integral part of the storage unit, defined as being for storing lock indications.

Whilst a history field could be stored per entry in the storage unit, in one embodiment each block comprises a plurality of entries forming a set in the storage unit. This arrangement advantageously requires less storage space, whilst still retaining a useful level of history information.

It is advantageous to store in the history field an indication which can reliably indicate whether the high priority storage item under consideration by the control circuitry has been recently stored in the storage unit. In one embodiment the indication in the history field is derived from a static value within the evicted high priority storage item. By deriving this indication from a static value the results of a later comparison can more reliably indicate whether this high priority storage item has indeed been stored before. In some embodiments the static value is an address portion of the evicted high priority storage item. The address portion presents a convenient static value by which to reference storage items. In one particular embodiment the static value is a tag portion of the address of the evicted high priority storage item. The tag portion represents a conveniently compact reference value requiring less storage space than the full address of the storage item. In another embodiment the static value is a tag bit of a tag portion of the address of the evicted high priority storage item, for example the least significant bit (LSB), although it will be appreciated that the most significant bit (MSB) could be used in an alternative embodiment. The fact that LSBs typically change more frequently than MSBs mean that the LSB is usually the advantageous choice for the tag bit. It will be recognised that a tag bit requires little dedicated storage space, however the inventors of the present invention have surprisingly found that whilst the full address would be needed to uniquely identify the storage item, even the much reduced information provided by a tag bit of a tag portion of an evicted high priority storage item still improves overall system performance, even though no longer uniquely identifying the storage item.

The comparison operation can be performed in a variety of ways and in one embodiment the comparison operation comprises comparing at least one bit of the allocated high priority storage item with at least one bit of the indication in a history field for the block containing the selected entry. Depending on the desired system performance sufficient improvement may be attained by only comparing one bit of the allocated high priority storage item with one bit of the indication in the corresponding history field, whereas in other applications a fuller comparison of more bits of each may be appropriate. For example, although the history field could comprise several bits, which in some circumstances could all be compared with the allocated high priority storage item, in other circumstances the comparison could reduce to only a single bit comparison.

The match condition may be defined in a variety of ways. In one embodiment the match condition comprises at least one bit of the allocated high priority storage item being identical to at least one bit of the indication in the history field for the block containing the selected entry. As with the comparison operation a range of match conditions may be contemplated from a single bit match to a multiple bit match.

It will be recognised by those skilled in the art that the storage unit could take a variety of forms. In one embodiment the storage unit is a cache, in another embodiment the storage unit is a branch target buffer and in a still further embodiment the storage unit is a translation lookaside buffer.

The correspondence between particular storage items and the entries in the storage unit in which they may be stored may vary. In one embodiment, the storage unit is a set associative storage unit, and in another embodiment the storage unit is a direct mapped storage unit.

A range of processing circuitries may result in multiple threads sharing the storage unit. In one embodiment, the processing circuitry comprises a multi-threaded processor core. In another embodiment the processing circuitry comprises multiple processor cores, each processor core executing at least one program thread.

It has been found that the techniques of the present invention are particularly advantageous when the high priority thread shares the storage unit with a limited number of lower priority threads. Hence, in one embodiment the processing circuitry is configured, when the number of lower priority threads being executed exceeds a predetermined value, to issue a control signal to cause the control circuitry to set the lock indication for every allocated high priority storage item. Hence, in this situation, all high priority storage items are preferentially retained in the storage unit, irrespective of whether they have been previously evicted or not.

In this case, for example when the number of lower priority threads being executed is not expected to fall in the near future, the energy expenditure of storing history information may no longer be worthwhile, and in one such embodiment the control signal further causes the control circuitry to deactivate population of the history field for each of the plurality of blocks of the storage unit.

It will be appreciated by those skilled in the art that the manner in which a victim entry is selected to be the entry into which a new storage item is allocated may be arranged in a variety of ways, but in one embodiment the control circuitry applies an eviction algorithm to determine a victim entry to be the selected entry into which a new storage item is allocated and is arranged to select preferentially the victim entry from amongst entries whose associated lock indication is not set. Hence, where possible the eviction algorithm avoids entries with an associated set lock indication, only selecting from amongst the locked entries if there are no unlocked entries to choose from. Alternatively, if seeking to allocate a lower priority storage item, and all possible entries for receiving that storage item have the lock indication set, the control circuitry may indicate that the low priority storage item cannot be allocated in the storage unit.

Viewed from a second aspect, the present invention provides a method of managing at least one storage unit in a data processing apparatus, said data processing apparatus comprising processing circuitry for executing multiple program threads including at least one high priority program thread and at least one lower priority program thread, said at least one storage unit being shared between the multiple program threads and comprising multiple entries, each entry for storing a storage item for reference by the processing circuitry when executing said program threads, each storage item being either a high priority storage item associated with said at least one high priority program thread or a lower priority storage item associated with said at least one lower priority program thread, said method comprising the steps of: retaining a history field for each of a plurality of blocks of the storage unit, each block comprising one or more of said entries; detecting an evicted high priority storage item being evicted from an entry of the storage unit as a result of allocation to that entry of an allocated lower priority storage item; on said detection populating the history field for the block containing that entry with an indication of said evicted high priority storage item; and when an allocated high priority storage item is allocated to a selected entry of the storage unit, performing a comparison operation between the high priority storage item and the indication in the history field for the block containing the selected entry, and on detection of a match condition setting a lock indication associated with said selected entry to inhibit further eviction of said allocated high priority storage item.

According to a third aspect, the present invention provides a data processing apparatus comprising: processing means for executing multiple program threads including at least one high priority program thread and at least one lower priority program thread; at least one storage means shared between the multiple program threads and comprising multiple entries, each entry for storing a storage item for reference by the processing means when executing said program threads, each storage item being either a high priority storage item associated with said at least one high priority program thread or a lower priority storage item associated with said at least one lower priority program thread; history storage means for retaining a history field for each of a plurality of blocks of the storage unit, each block comprising one or more of said entries; and control means for, on detection of an evicted high priority storage item being evicted from an entry of the storage means as a result of allocation to that entry of an allocated lower priority storage item, populating the history field for the block containing that entry with an indication of the evicted high priority storage item, the control means being further for performing, when an allocated high priority storage item is allocated to a selected entry of the storage means, a comparison operation between the allocated high priority storage item and the indication in the history field for the block containing the selected entry, and on detection of a match condition said control means setting a lock indication associated with said selected entry to inhibit further eviction of said allocated high priority storage item.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
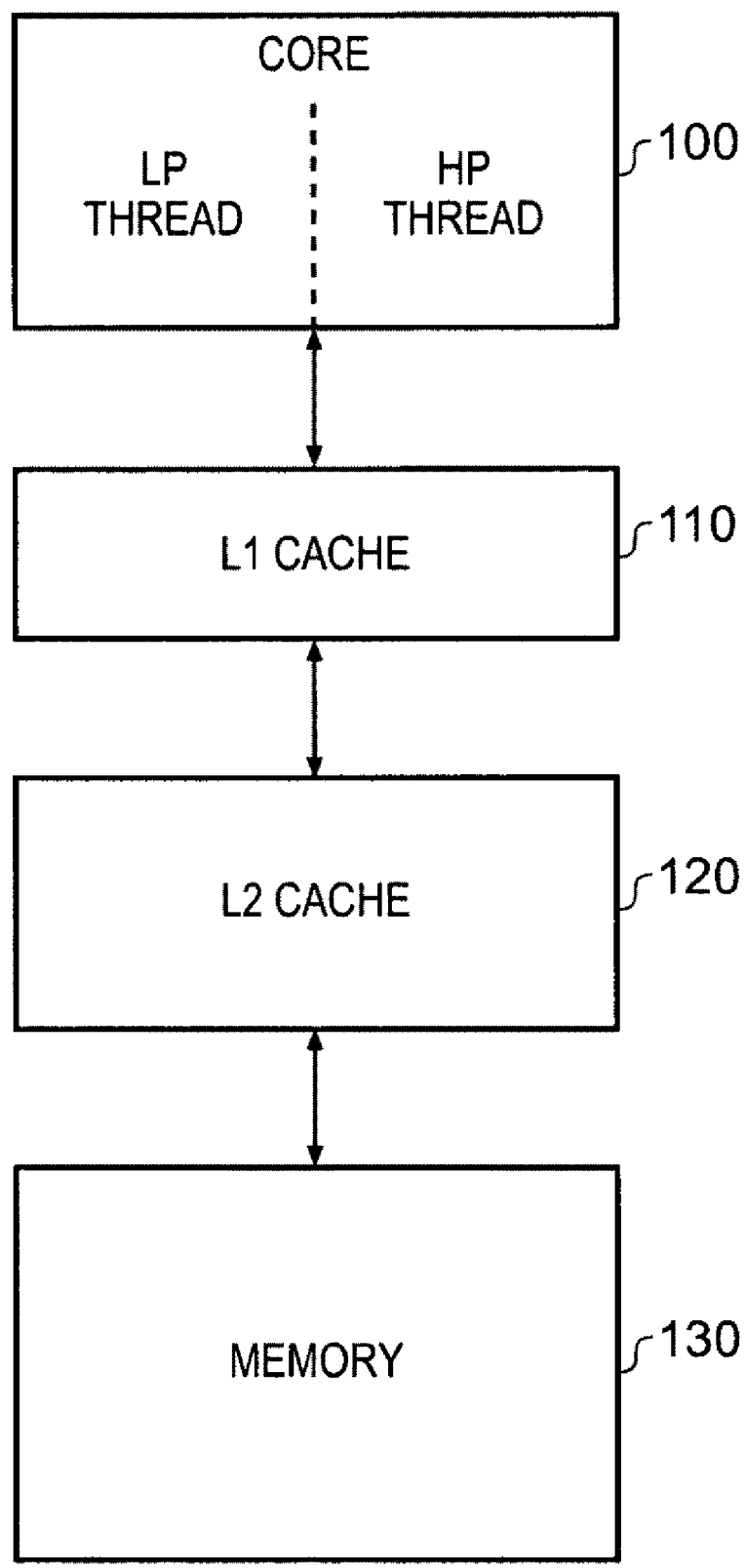
FIG. 1 schematically illustrates a data processing apparatus according to one embodiment of the present invention, where the processing circuitry comprises a single multi-threaded processor core.

FIG. 1 schematically illustrates a multi-threaded (MT) processor core 100 arranged to utilise the techniques of embodiments of the present invention. Here, the single processor core 100 is executing both a lower priority (LP) thread and a high priority (HP) thread. Processor core 100 is connected to a memory hierarchy comprising level 1 (L1) cache 110, level 2 (L2) cache 120 and main memory 130. Access requests for either thread executing on processor core 100 are passed to L1 cache 110, and if they miss there onto L2 cache 120. Further, if the requested data is not found in the L2 cache 120, then the requested data is accessed in main memory 130. Note that here the "data" being accessed in the memory hierarchy could in fact comprise either data values (being read or written) or instructions (being read)—for the purposes of this description further distinction between the two is not made unless appropriate. Hence, in this example embodiment, the HP thread executing on processor core 100 is sharing both L1 cache 110 and L2 cache 120 with the LP thread also executing on processor core 100. It will be appreciated that processor core 100 is nor restricted to only executing two threads, and hence in other embodiments more threads may be executing.

Figure 2:
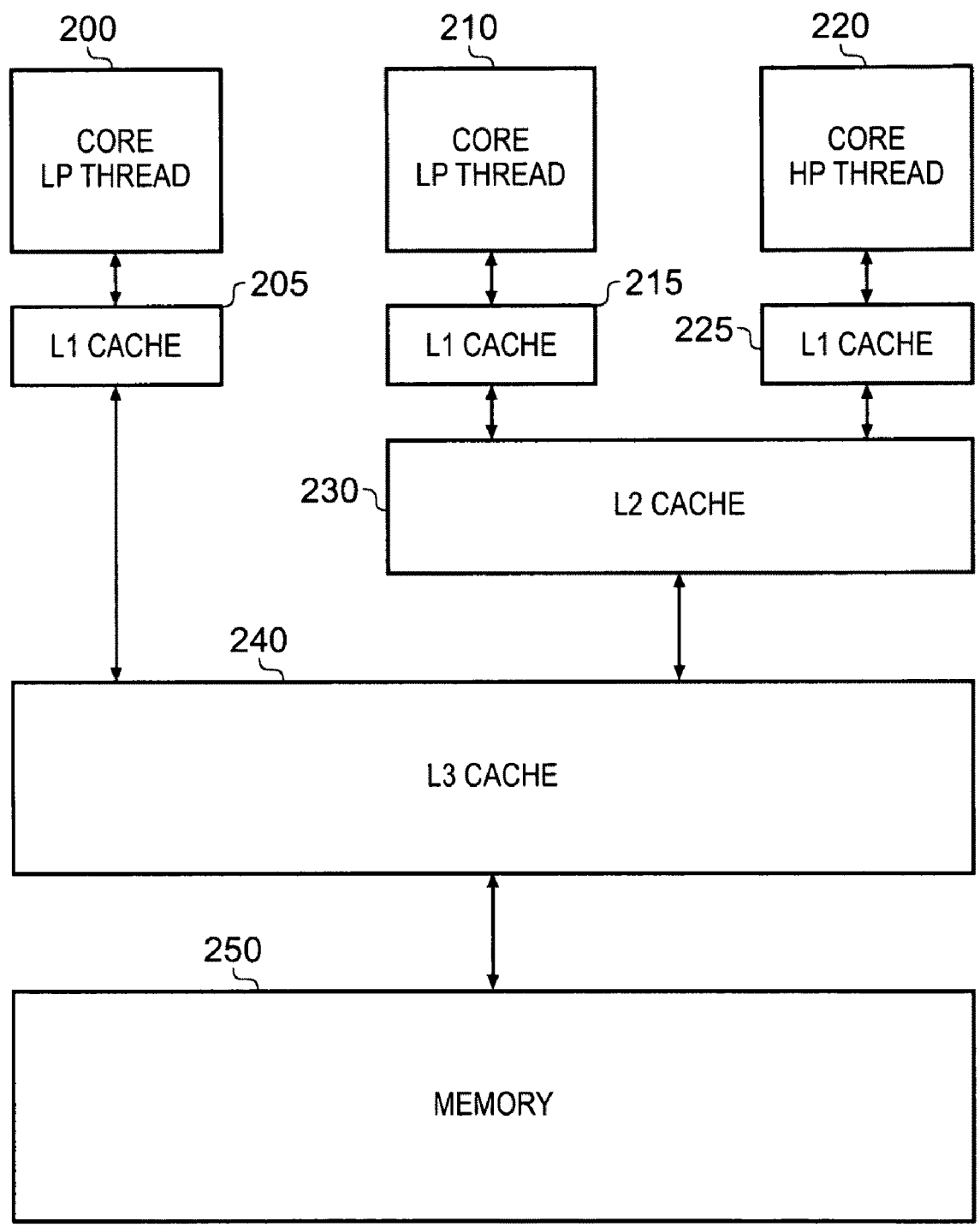
FIG. 2 schematically illustrates a data processing apparatus according to one-embodiment of the present invention, where the processing circuitry comprises multiple processor cores.

FIG. 2 schematically illustrates an alternative multi-threaded system arranged to utilise the techniques of embodiments of the present invention. In this example embodiment the three processor cores 200, 210 and 220 are each executing a single thread, cores 200 and 210 executing LP threads and core 220 executing an HP thread. Furthermore, in this example each processor core has an associated L1 cache (205, 215 and 225). L1 cache 205 is connected directly to L3 cache 240, whereas L1 caches 215 and 225 are connected to L3 cache 240 via L2 cache 230. L3 cache 240 is then connected to main memory 250. Hence, in this example embodiment it will be appreciated that the HP thread executing on processor core 220 is sharing L2 cache 230 with the LP thread executing on processor core 210, and is sharing L3 cache 240 with both the LP thread executing on processor core 200 and the LP thread executing on processor core 210.

Figure 3:
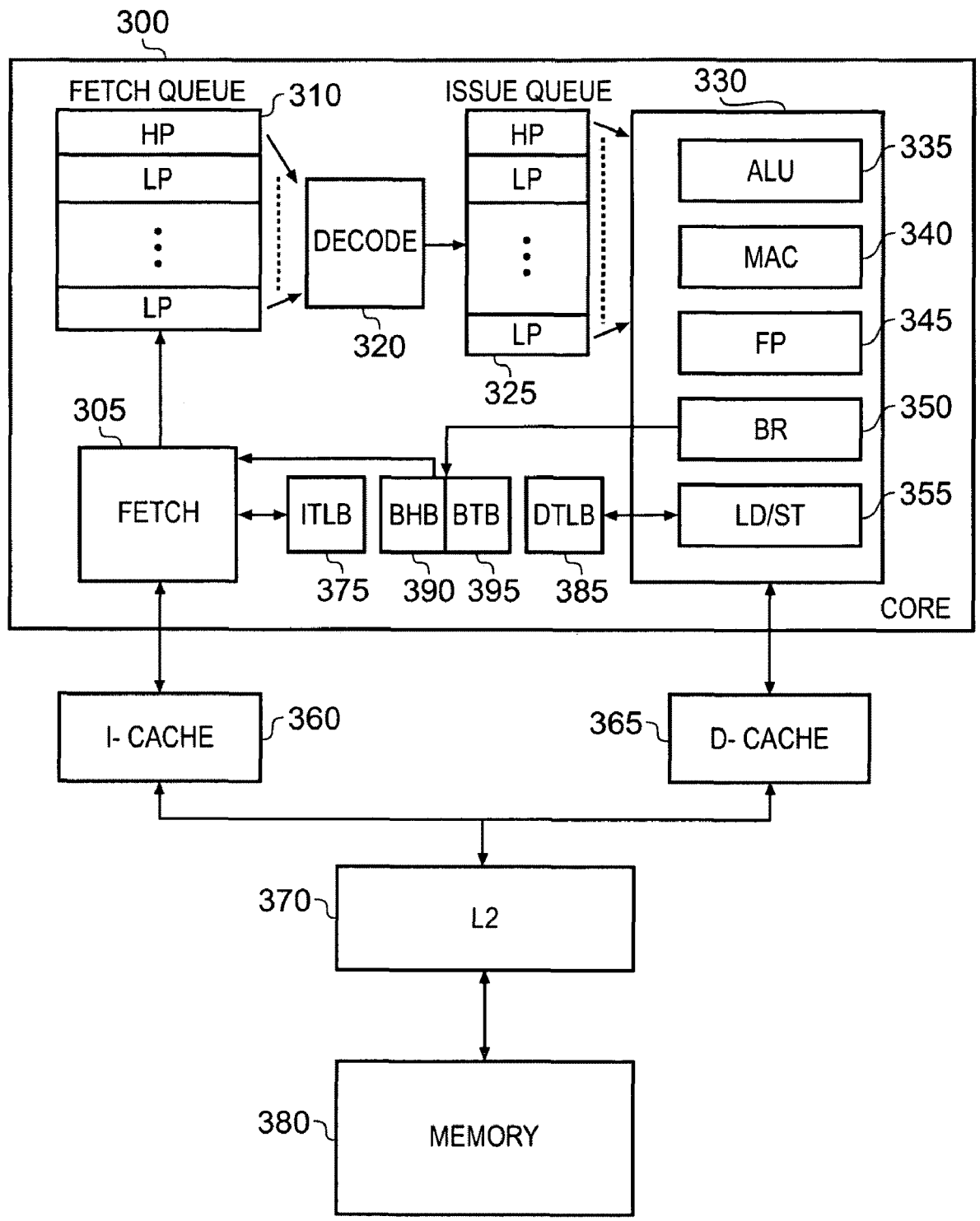
FIG. 3 schematically illustrates a data processing apparatus according to one embodiment of the present invention.

FIG. 3 illustrates a data processing apparatus in accordance with one embodiment of the present invention. In accordance with this embodiment, a multi-threaded processor core 300 (such as a coarse grained multi-threaded processor, fine grained multi-threaded processor, or simultaneous multi-threaded (SMT) processor) is used to execute multiple program threads. For the purposes of the following discussion, it will be assumed that the processor core 300 is an SMT processor core. In the example of FIG. 3, one of the program threads is considered to be a high priority program thread, and the remaining program threads are considered to be lower priority program threads. A fetch unit 305 is used to fetch instructions from memory for the various program threads and place those instructions within the fetch queue 310, which can be considered to comprise separate queues for each program thread. Each of the instructions is decoded by the decoder 320 to produce operation control information specifying the required data processing operation to be performed, with that operation control information then being placed within the issue queue 325. The issue queue can be considered to have separate queues for each thread.

Each program thread shares the resources of the SMT core. In one embodiment, if the high priority program thread has operations to be performed, they take precedence over any operations to be performed in respect of the lower priority program threads, and accordingly if the issue queue 325 contains operation control information relating to a high priority program thread, then that will be routed to the relevant one of the execute units 330 in preference to operation control information relating to a lower priority program thread. However, in the absence of any operations needed in respect of the high priority thread, then operations associated with one or more lower priority threads will be routed to the relevant one or more of the execute units 330.

As shown in FIG. 3, a number of execute units 330 will typically be provided within the SMT core. For example, an arithmetic logic unit (ALU) 335 will be used to perform arithmetic operations, and a multiply accumulate (MAC) unit 340 will be used to perform multiply accumulate operations. A floating point (FP) unit 345 will be used to perform floating point operations, a branch unit (BR) 350 will be used to perform branch operations, and a load/store (LD/ST) unit 355 will be used to perform load or store operations in order to load data from memory into working registers of the SMT core, or to store data from such registers back to memory.

When the fetch unit 305 wishes to fetch an instruction, it will typically output the address of that instruction to the instruction cache 360, which will then perform a lookup operation in order to determine whether the instruction requested is currently stored within the cache. If it is, then the instruction will be returned to the fetch unit 305, whereas otherwise a line fill operation will be invoked whereby the instruction cache 360 selects a victim cache line to be evicted from the cache, and issues a line fill request to the L2 cache 370 in order to obtain a cache line's worth of instructions, including the instruction requested by the fetch unit. If the L2 cache 370 has the required instructions, it will return them to the instruction cache 360, whereas if it does not a similar line fill operation will be invoked to order to cause an L2 cache line to be evicted and an L2 cache line's worth of instructions to be retrieved from main memory 380 for storing in the L2 cache, whereafter an L1 cache line's worth of instructions will be returned to the instruction cache 360.

Similarly, if the load/store unit 355 wishes to access data, it will typically issue an access request for that data to the data cache 365, and on receipt of that access request the data cache 365 will determine whether the data being requested is present in the data cache. If so, the data will be accessed in cache, whereas otherwise a line fill operation will be performed during which the data cache 365 will select a victim cache line for eviction, and will issue a line fill request to the L2 cache 370 in order to obtain a cache line's worth of data including the data the subject of the access request from the load/store unit 355. The L2 cache 370 then operates in the same manner as discussed earlier with reference to the instruction fetch process.

Whilst in FIG. 3 it is assumed that at the L1 cache level a separate instruction cache 360 and separate data cache 365 are provided, it will be appreciated that there is no requirement for separate instruction and data caches at the L1 level, and instead a unified L1 cache (as is the case in the example embodiment of FIG. 1) could be used. Similarly, whilst the L2 cache 370 is shown as a unified cache, there is no requirement for the L2 cache to be a unified cache, and accordingly a L2 cache could alternatively take the form of a separate instruction cache and a separate data cache.

The above mentioned instruction cache 360, data cache 365, and L2 cache 370 are examples of storage units that are shared between the multiple program threads, and it will be appreciated that when data and/or instructions pertaining to a lower priority program thread are stored in one of the caches, the eviction process used to make room for that information (in the absence of any prioritisation scheme) could cause data and/or instructions pertaining to the high priority program thread to be evicted, which could adversely affect the performance of the high priority thread.

In addition to the caches, there are typically other shared storage units provided within the system. For example, an instruction translation lookaside buffer (ITLB) 375 will typically be provided in association with the fetch unit 305, and prior to issuing a fetch request for an instruction, the fetch unit 305 will reference the instruction TLB 375 in order to obtain access control information for a memory region including the address of the instruction to be fetched. This access control information is typically retrieved by the instruction TLB from a page table in memory, and in particular such page tables typically include descriptors for a number of different memory regions. If the fetch unit 305 specifies an address which does not match any of the entries currently stored in the ITLB 375, then typically the relevant page table in memory will be accessed in order to retrieve the required descriptor and then store within an entry of the ITLB the relevant access control information. As part of this process, a victim entry in the ITLB 375 needs to be selected, and its contents are then overwritten with the above-mentioned access control information.

A data translation lookaside buffer (DTLB) 385 can be used in an identical manner to provide access control information in association with each access request to be issued by the load/store unit 355, and again victim entries are selected as and when required to make room for new access control information retrieved from descriptors in memory to be stored in the data TLB.

Of relevance here, as with the earlier-mentioned example of caches, it will be appreciated that the activities of the lower priority program thread(s) could (in the absence of any prioritisation scheme) cause data related to the high priority program thread to be replaced in the ITLB 375 and/or DTLB 385, thereby adversely affecting the performance of the high priority program thread if that data subsequently needs to be retrieved from memory.

The fetch unit 305 will often use branch prediction circuitry for identifying branch instructions and predicting whether those branch instructions will be taken. Often a branch history buffer (BHB) 390 is used to store summary information about the direction a branch took the last few times it was executed, and this information is used to predict whether a branch will be taken or not taken. In particular, the BHB comprises a plurality of entries, each entry maintaining a counter value. An index generator is used to index into a particular entry of the BHB, and various branch instructions may index into the same BHB entry. Each BHB is updated with the results of previous branch instructions that index into that entry, such that for each taken-branch the appropriate counter is incremented, and likewise for each not taken branch the appropriate counter is decremented. When making a prediction for a branch instruction not yet executed, the appropriate entry is reviewed and the counter value stored therein is used to predict whether the branch instruction will be taken or not taken.

For a branch instruction which is predicted to be taken the fetch unit then needs to determine the next instruction to be fetched, and in the illustrated embodiment a branch target buffer (BTB) 395 is referenced by the fetch unit 305 in order to seek to identify the target address for the branch instruction, and hence identify the next instruction to be fetched. If, on accessing the BTB 395, it is determined that none of the entries in the BTB 395 provide a target address for the branch instruction in question, then the fetch unit 305 will not at that time be able to determine the target address, and accordingly will have to take some different action, for example by stopping the fetch process, fetching from sequential addresses, etc. However, when the branch instruction is subsequently executed the branch unit 350 will determine the target address, and can provide that information to the branch prediction circuitry for storing in the BTB 395. In particular, the BTB will select the victim entry to become an allocated entry for that branch target information, an indication of the branch instruction and the associated target address then being stored in that victim entry. As with the earlier-mentioned examples of the caches and TLBs it will be appreciated that the activities of the lower priority program thread(s) could (in the absence of any prioritisation scheme) cause target address information for high priority program thread branch instructions to be overwritten in the BTB 395 by target address information for lower priority program thread branch instructions, thereby adversely affecting performance of the high priority program thread.

Figure 4:
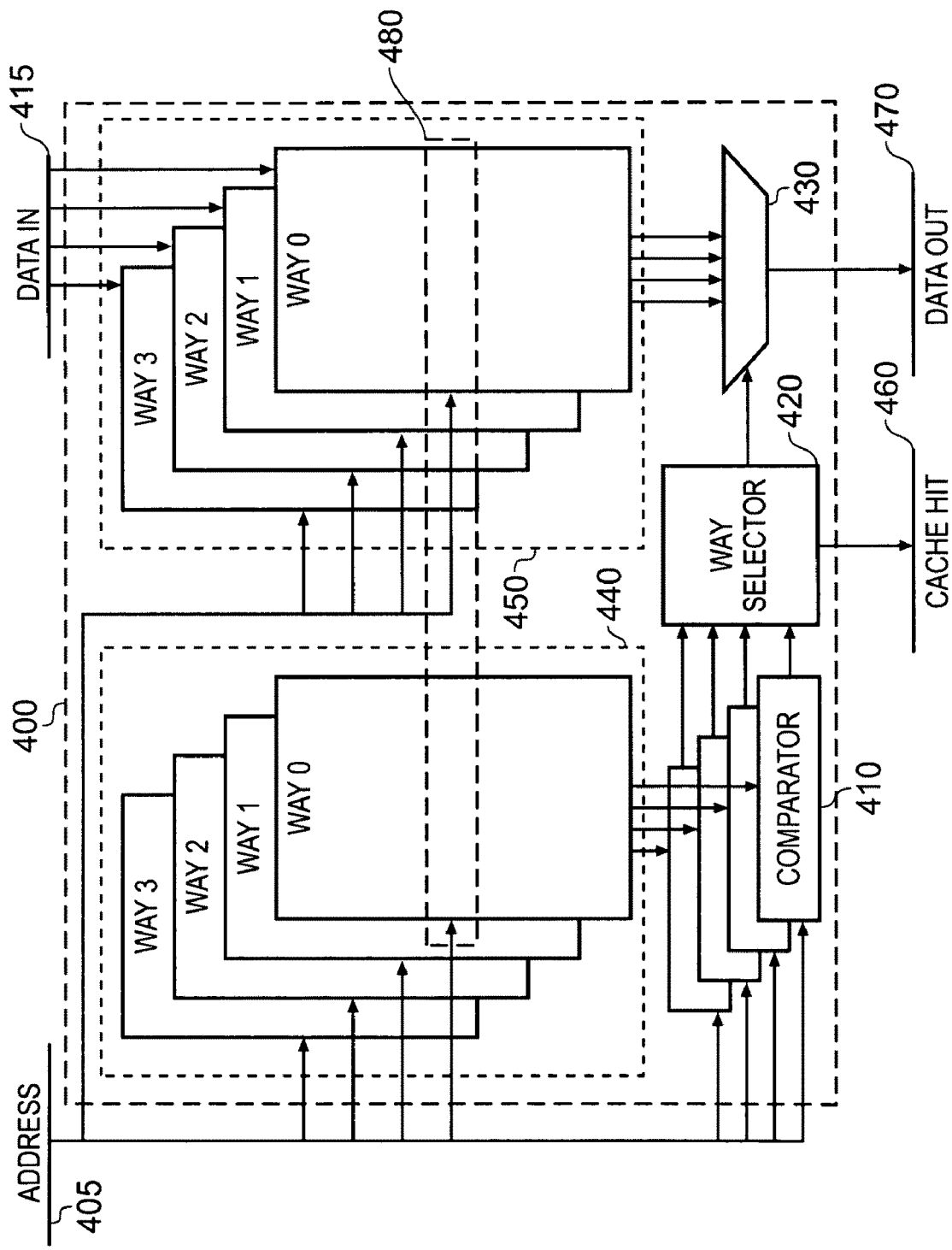
FIG. 4 schematically illustrates a set associative cache.

FIG. 4 schematically illustrates the operation within an n-way set associative storage unit, such as one of the caches illustrated in FIGS. 1-3, when a lookup operation for an access is performed within the set associative storage device 400. In this example, the set associative storage device 400 is a four way set associative cache. The cache comprises four ways, a comparator 410 associated with each way, a way selector 420 and a multiplexer 430. A tag RAM 440 is provided containing a tag memory for each way, and similarly a data RAM 450 is provided comprising a data memory for each way. The data memory of each way contains a plurality of cache lines that are arranged to store data values. Each set comprises one cache line in each way. In the context of the present invention the combination of a cache line in the tag RAM and a cache line in the data RAM (illustrated by dashed line 480) is referred to as an "entry" in the cache.

When a lookup operation is performed, the set portion of the address is routed from address line 405 to each of the tag memories and data memories to identify the cache lines of the relevant set. Within the tag array 440, the tag values from the cache lines identified by the set portion of the address are output to the comparators 410 which also receive the tag portion of the address from address line 405. Each comparator then compares the tag portion of the address with the tag value received from the corresponding way, and outputs the result of that comparison to the way selector 420. In the event that one of the comparators identifies a match, the way selector outputs a cache hit signal on path 460, this cache signal identifying the way in which the hit was detected. In the event that no matches are detected by the comparators, the way selector 420 instead outputs a cache miss signal.

Meanwhile, the set portion of the address as routed to the data RAM 450 causes the relevant cache line to be accessed within the set. In the event of a read access where a cache hit is detected, the way selector 420 will output a signal to the multiplexer 430 to identify which cache line's data should be output over path 470. The word and byte portions of the address can at this stage be used to identify the particular word or byte to be output.

In the event of a write access which hits in the cache, then if the write access is allowed to proceed then the relevant data can be forwarded to the appropriate way of the data RAM 450 over path 415 for storing in the relevant cache line.

Figure 5A:
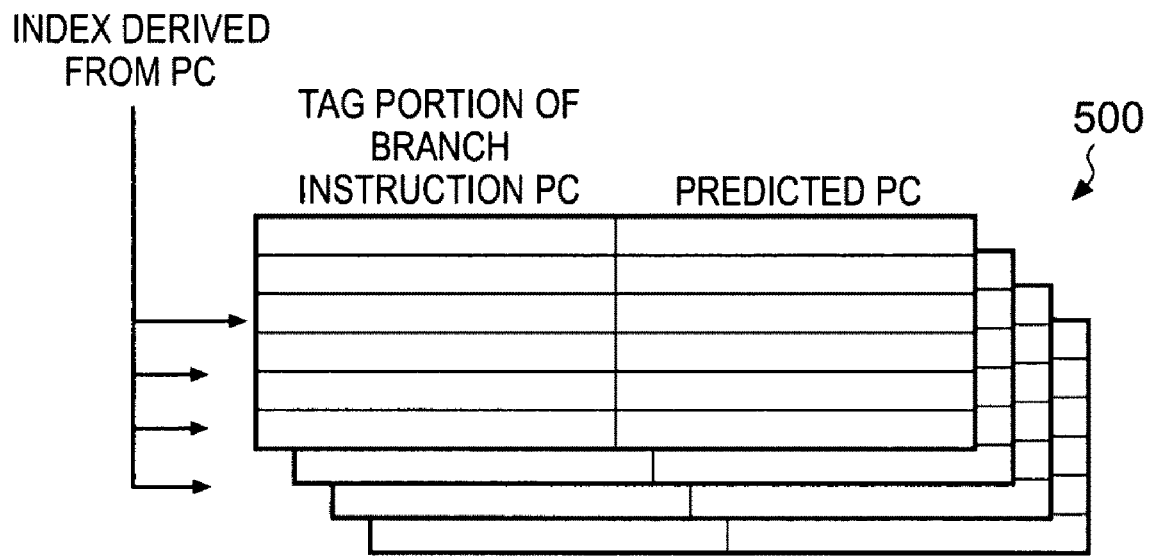
FIG. 5A schematically illustrates a set associative branch target buffer.

FIG. 5A illustrates a storage unit in accordance with one embodiment of the present invention. In accordance with this embodiment, the storage unit is a branch target buffer (BTB) 500. This BTB 500 is arranged, like the cache in FIG. 4, in a set associative fashion. BTB 500 is referenced with an index derived from the program counter (PC) of the branch instruction under consideration. This index is used to reference the relevant set in the BTB in which tag portions of branch instruction program counters are stored. In essence, this BTB operates much the same as the cache in FIG. 4 and further details is not given here, although tag portions of branch instruction program counters substitute for addresses and predicted program counters substitute for data.

Figure 5B:
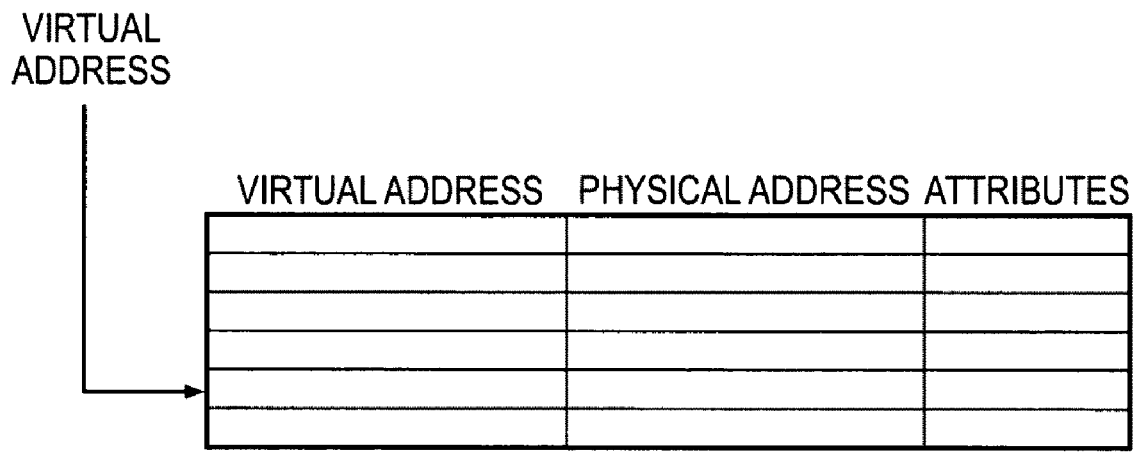
FIG. 5B schematically illustrates a direct mapped translation lookaside buffer.

FIG. 5B illustrates a storage unit in accordance with another embodiment of the present invention. In accordance with this embodiment, the storage unit is a translation lookaside buffer (TLB) which, unlike the examples of FIG. 4 and FIG. 5A, is direct mapped. This direct mapping means that there is only one location that any given virtual address can be stored in this TLB (i.e. there is no set). If a given virtual address matches an entry in the virtual address column then the physical address and its attributes are read out.

Figure 6:
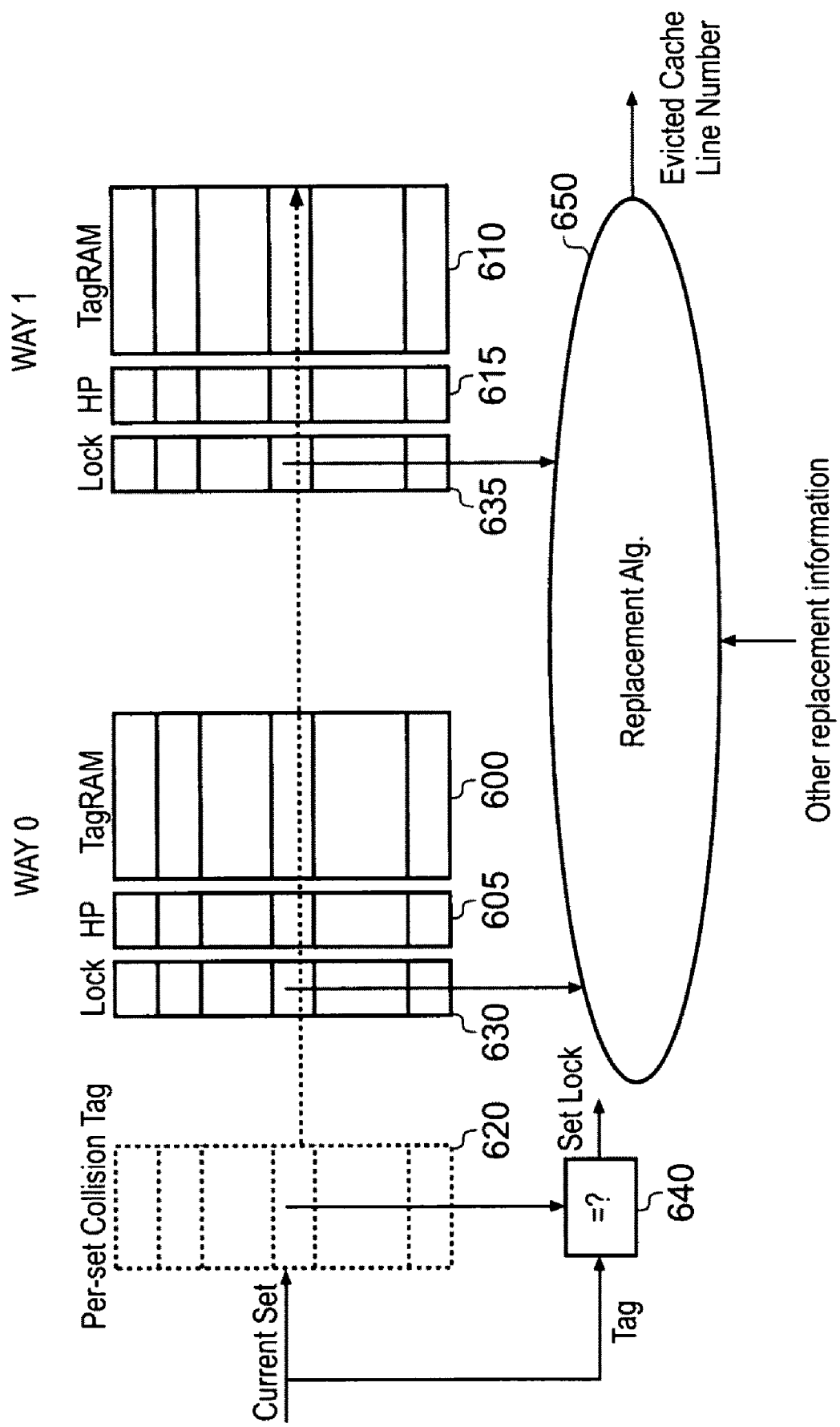
FIG. 6 schematically illustrates a set associative cache according to one embodiment of the present invention, storing per set tag history information.

FIG. 6 illustrates a storage unit in accordance with one embodiment of the present invention. In accordance with this embodiment the storage unit is a set associative cache such as that illustrated in FIG. 4. For simplicity, in FIG. 6 only two ways (way 0 and way 1) are illustrated and only the tag RAMs (i.e. not the data RAMs) are shown. The operation of the techniques of this embodiment of the present invention then proceed as follows. When a cache line associated with a high priority (HP) thread is allocated into the cache the tag portion is written into the appropriate entry of either tag RAM 600 or tag RAM 610. Additionally, a bit is set in the corresponding HP column 605 or 615 to indicate that this cache line is associated with a high priority thread. Then, when a new cache line is allocated to the same location, this is not prevented regardless of whether the thread causing that allocation is lower priority (LP) or HP. However, if the cache line being allocated is associated with an LP thread and the entry in the cache into which it is to be stored is marked as associated with an HP thread (by virtue of the HP bit being set) then the eviction is allowed to proceed, but the tag portion of the evicted HP entry is stored in the corresponding entry of the collision tag history storage 620. Also the bit set in the corresponding HP column 605 or 615 is cleared to indicate that the entry is now one that is associated with an LP thread. In this embodiment there is one collision tag entry per set. It will be appreciated that there could be an individual collision tag history entry for each cache entry but this would require more storage space.

Then, the next time that a cache line is allocated to this entry of the cache for a high priority thread the allocated line's tag portion is compared with the collision tag-stored for that set. If these match then comparison unit 640 will indicate that the corresponding lock should be set, and the corresponding lock bit of the lock bits 630 or 635 is set. Once the lock bit has been set then this cache line associated with the HP thread can no longer be evicted from the cache by an incoming cache line associated with an LP thread, unless all locations to which that incoming cache line could be allocated are locked, in which case any of the known eviction algorithms e.g. least recently used, could be employed to select the victim. Alternatively, in an even stricter embodiment LP threads could never evict locked HP cache lines and would be forced to always retrieve their data from the next level of the cache hierarchy. Which cache line is selected for eviction is determined by replacement algorithm logic block 650, based on which locks are set and on other replacement information, such as a current eviction policy.

Figure 7A:
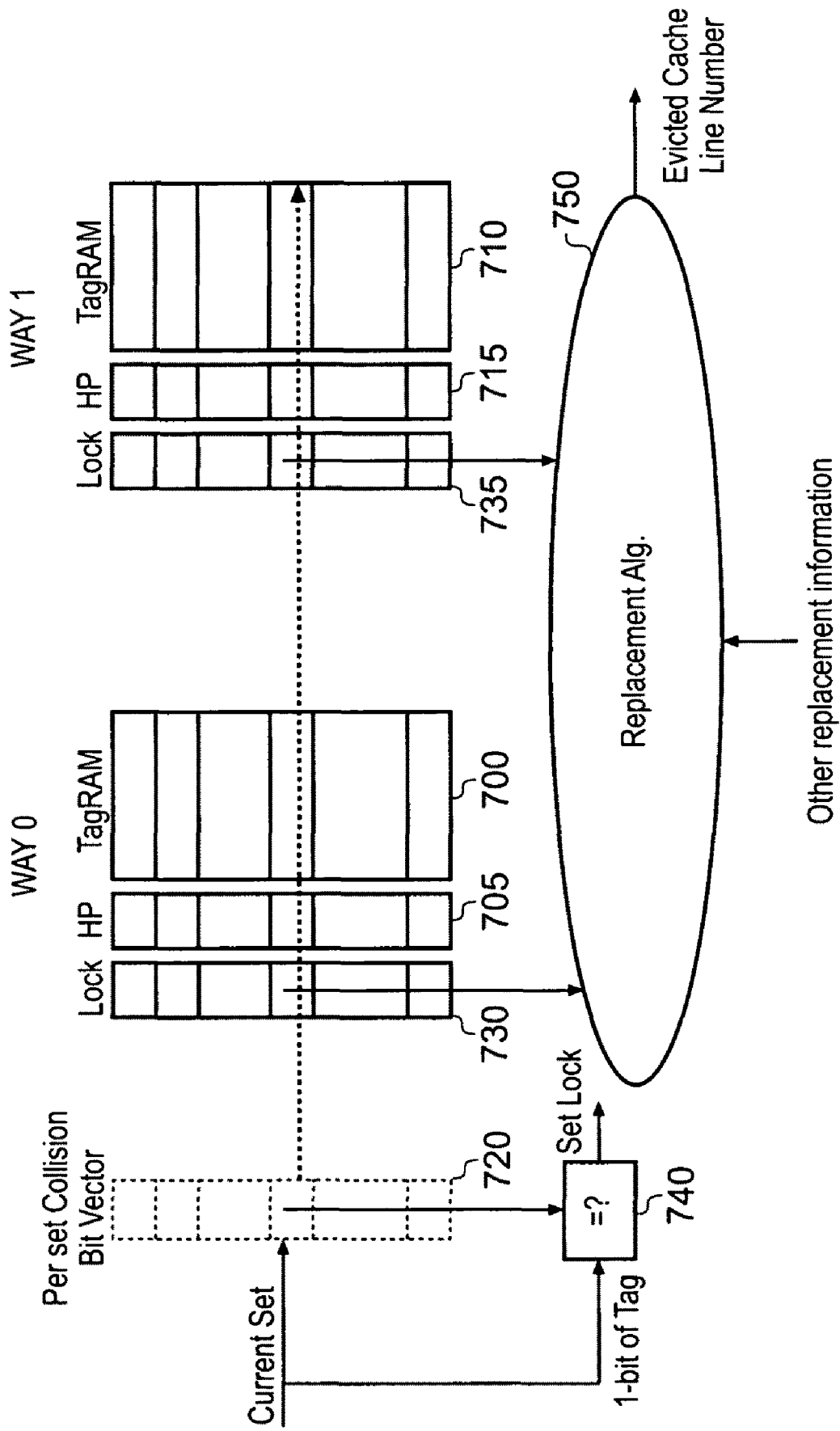
FIGS. 7A and 7B schematically illustrates a set associative cache according to one embodiment of the present invention, storing per set bit history information.

FIG. 7A illustrates an identical set up to that illustrated in FIG. 6, with the one exception that instead of a per set collision tag being stored a per set collision bit vector is stored. In other words, components 700, 705, 710, 715, 730, 735, 740 and 750 in FIG. 7A are directly equivalent to components 600, 605, 610, 615, 630, 635, 640 and 650 in FIG. 6, respectively. The per set collision bit vector 720 only stores a single bit of the tag portion derived from the address of the data stored in the cache entry (typically the least significant bit), yet it has been surprisingly found that even this limited amount of information is sufficient to improve overall system performance as will be discussed in more detail later.

Figure 7B:
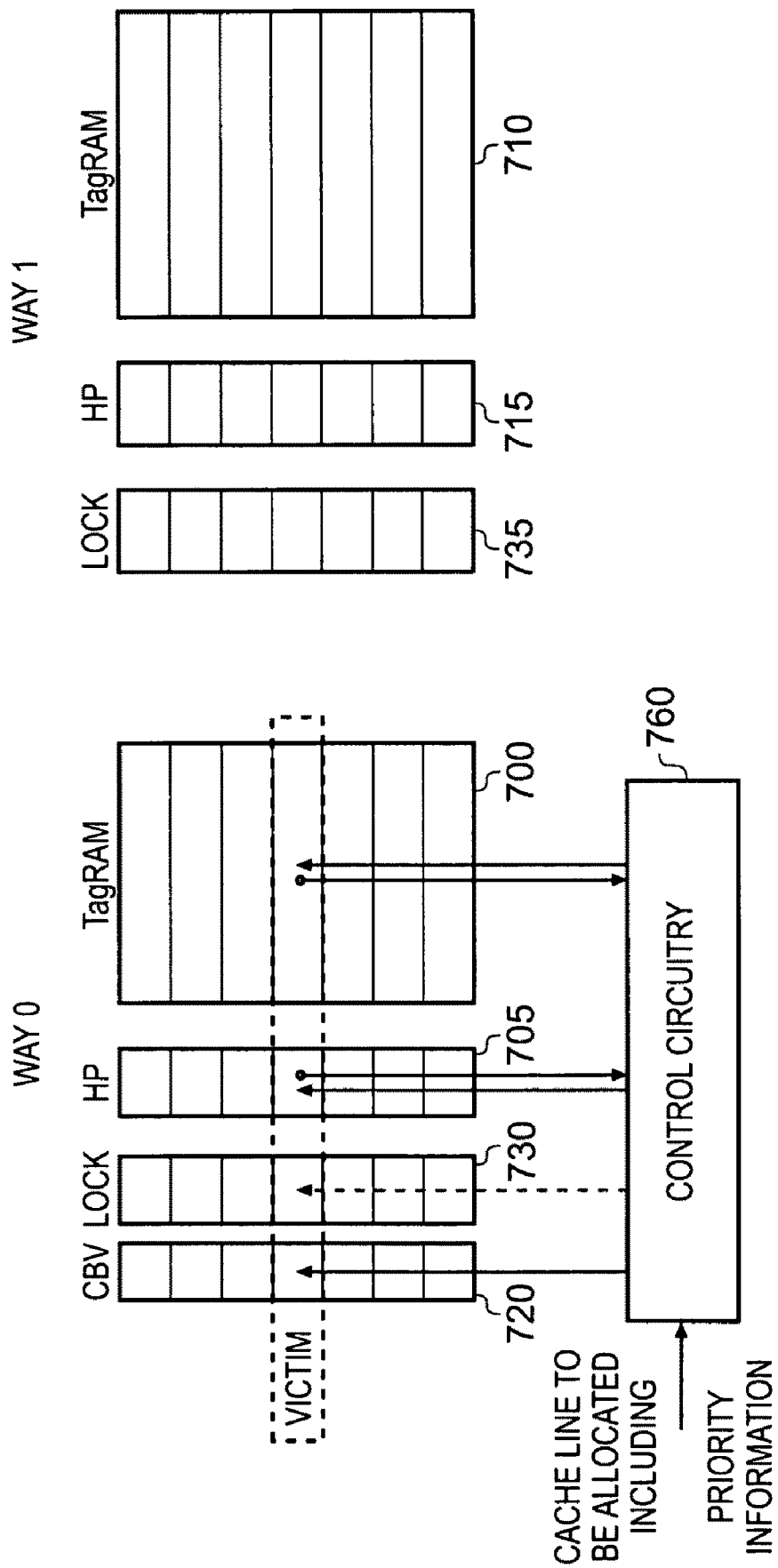

FIG. 7B further illustrates the embodiment illustrated in FIG. 7A, showing the operation of the control circuitry 760 when allocating a cache line. In this illustrated example the victim cache line is in way 0. The control circuitry 760 compares the priority of the victim cache line (from the bit set in the corresponding entry of the HP column 705) with the priority of the allocated cache line. In the event that a high priority cache line is being evicted by allocation of a lower priority cache line, the control circuitry 760 populates the corresponding entry of the collision bit vector 720 with a single bit derived from the corresponding entry in the tag RAM 700. The corresponding entry of the HP column 705 is also set to indicate a lower priority entry and the corresponding entry in the tag RAM 700 is filled with the tag portion of the address of the allocated cache line. If necessary (e.g. because a locked entry had to be selected as the victim due to lack of unlocked candidates), the control circuitry can also unlock the corresponding lock bit of the lock bits 730.

Figure 8:
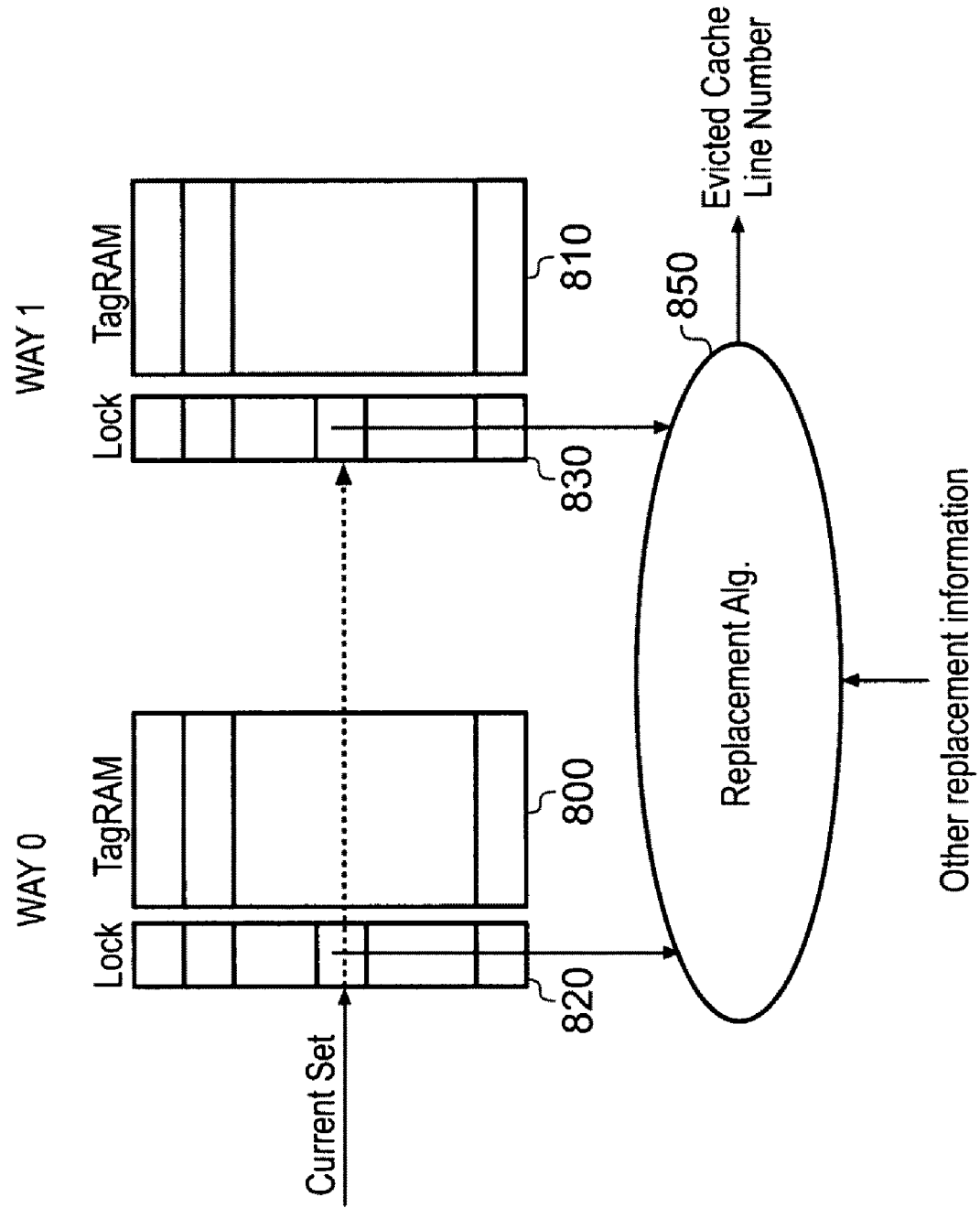
FIG. 8 schematically illustrates a set associative cache according to one embodiment of the present invention, when a high number of low priority threads is being executed.

FIG. 8 illustrates a storage unit in accordance with one embodiment of the present invention. The data processing apparatus has switched into a mode of operation wherein cache lines associated with a high priority thread are locked as soon as they are first stored in the cache. It has been found to be advantageous for overall system performance if the storage unit switches to this kind of operation when the number of lower priority threads being executed by the processing circuitry exceeds a predetermined number, as will be discussed in more detail later. This style of operation is referred to herein as high priority always locked (HPAL) operation. Tag RAMs 800 and 810, as well as replacement algorithm logic block 850 function in the same manner as their equivalents in FIGS. 6 and 7. Since the cache lines associated with high priority threads are always locked in this mode of operation, the sets of lock bits 820 and 830 can be considered to represent both the sets of locks and HP bits for each way illustrated in FIGS. 6 and 7. Indeed, in embodiments of the present invention, it is preferable when switching to HPAL operation to simply simultaneously set the lock and HP bits for a given entry, since this affords the possibility to later more easily cease HPAL operation and return to normal operation.

Figure 9:
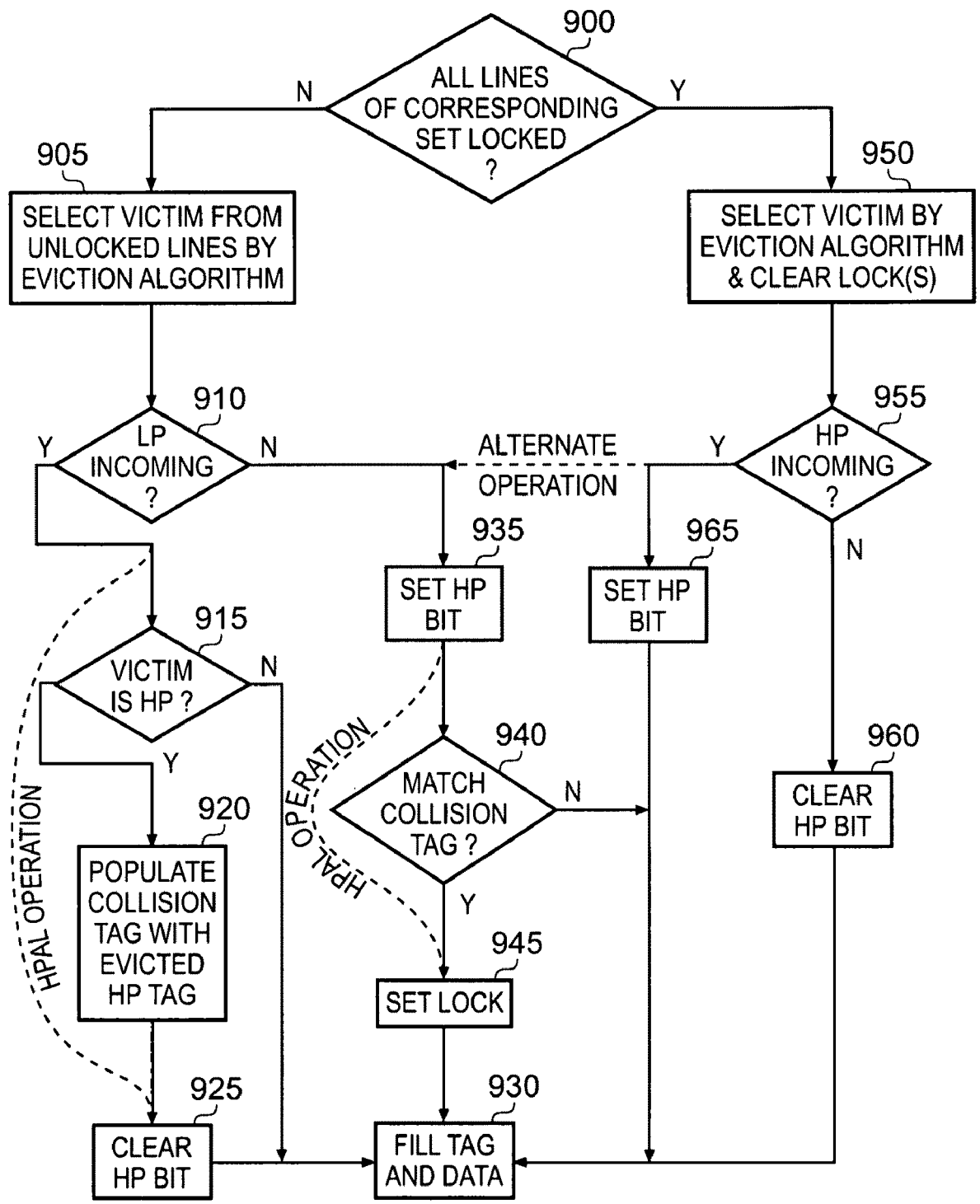
FIG. 9 schematically illustrates the functional steps of one embodiment of the present invention.

FIG. 9 schematically illustrates a series of steps performed by a data processing apparatus in accordance with one embodiment of the present invention. When a cache line is required to be allocated into the cache it is first checked at step 900 if all lines of the corresponding set are locked. If all lines of the corresponding set are not locked then at step 905 a victim line from amongst the unlocked lines is selected by an eviction algorithm (e.g. least recently used (LRU)). Then at step 910 it is determined if the line to be allocated is associated with an LP thread. If it is associated with an LP thread then at step 915 it is determined if the victim line is associated with an HP thread, i.e. the associated HP bit is set. If the victim line is associated with an HP thread then at step 920 the corresponding collision tag entry is populated with the tag of the evicted HP entry. Then, at step 925, the corresponding HP bit is cleared (since the cache line being allocated is associated with an LP thread) and finally at step 930 the line fill occurs and the tag and data RAMs are populated with the information from the allocated cache line. If at step 915 the victim line is determined not to be associated with an HP thread (i.e. it is associated with a lower priority thread), then the flow proceeds directly to step 930.

If however at step 910 it is determined that the cache line to be allocated is associated with an HP thread then the flow proceeds to step 935 where the corresponding HP bit is set. It is then determined at step 940 whether the tag portion of the cache line being allocated matches that stored in the corresponding collision tag entry. If it does, then at step 945 the corresponding lock bit is set and the flow proceeds to step 930. If at step 940 it does not match, then the flow proceeds directly to step 930.

Returning to step 900, if instead all lines of the corresponding set are locked, then at step 950 a victim entry is selected by an eviction algorithm (e.g. LRU) and the lock bit of that entry is cleared. Additionally, in some embodiments, it may be chosen at this point to clear all lock bits and thereby refresh the locking mechanism. At step 955, if the cache line to be allocated is not associated with an HP thread, then at step 960 the corresponding HP bit is cleared (if necessary) and the flow proceeds to step 930. If however at step 955 the cache line to be allocated is associated with an HP thread then at step 965 the corresponding HP bit is set and the flow proceeds to step 930. In an alternative arrangement if at step 955 it is established that the cache line to be allocated is associated with an HP program thread the flow can proceed to step 935 to set the HP bit, so that thereafter the comparison with the stored collision tag at step 940 is performed, thus making use of the history information established previously.

In the case where the number of LP threads being executed on the processing circuitry exceeds a predetermined number and the data processing apparatus switches into HPAL mode as discussed earlier with reference to FIG. 8, then the paths illustrated in FIG. 9 by dashed lines ("HPAL operation"), i.e. from step 910 directly to step 925 and from step 935 directly to step 945, are then taken. As mentioned with reference to FIG. 8, by both setting the HP bit (at step 935) and setting the lock bit (at step 945) in HPAL operation this enables the data processing apparatus to switch back to normal operation when the number of lower priority threads being executed on the processing circuitry falls back below that predetermined number.

Figure 10:
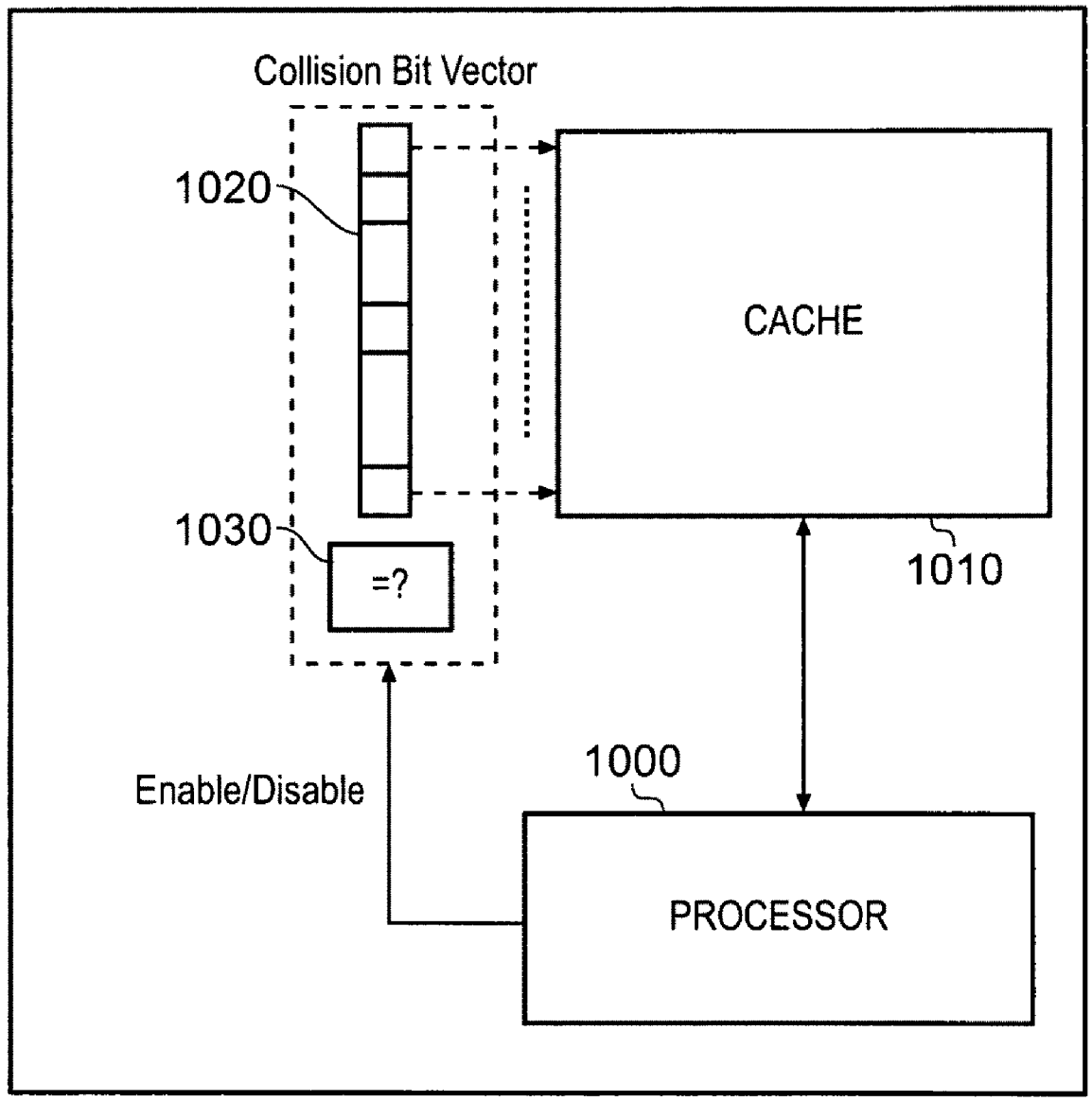
FIG. 10 schematically illustrates a data processing apparatus according to one embodiment of the present invention, arranged to switch between two modes of operation.

FIG. 10 schematically illustrates a data processing apparatus in accordance with one embodiment of the present invention. In accordance with this embodiment, a multi-threaded processor core 1000 retrieves data from and stores data in cache 1010 making use of the collision bit vector 1020 and control circuitry 1030 to carry out the techniques of embodiments of the present invention described above. As illustrated by the dotted line surrounding collision bit vector 1020 and control circuitry 1030, this portion of the data processing apparatus may be enabled or disabled according to whether the collision bit vector information is being used or whether HPAL mode is currently active (for example depending on the number of lower priority threads currently being executed as discussed above with reference to FIG. 9).

The relative performance of the different embodiments of the present invention have been tested using a simulation study, using a multithreading (MT) simulation model on a shared 2-way 8 kB data cache shared by two and four threads. In the two thread model one thread is HP and the other is LP. In the four thread model one thread is HP and the other three threads are all LP threads. Nine memory intensive EEMBC benchmarks (representative applications from diverse fields such as multimedia, automotive, consumer electronics and wireless segments) were used.

First the HPAL mode of operation is considered since this represents the upper limit of performance for HP threads. Table 1 shows the speed up of the HP thread with respect to the baseline model. Note that the baseline model is an MT model with the same thread configuration that does not use any locks and therefore performs the traditional cache replacement without differentiating between thread priorities.

TABLE 1

Speed up in HP thread under HPAL operation

| Number of threads | % speed up in HP thread |
|---|---|
| 2 | 7.3% |
| 4 | 12.1% |

It can be seen that there is steady improvement in the HP thread's execution time as the number of LP threads increases. More LP threads would increase the probability of evicting an HP cache line from a cache and since the HPAL scheme is overprotective of the high priority cache lines the HP thread sees considerable improvement in its execution time.

On the other hand, the degradation in the performance of the LP threads can be measured by their combined instructions per cycle (IPC). Table 2 shows the percentage drop in the IPC of the LP threads relative to the IPC of the baseline MT model.

TABLE 2

Instructions Per Cycle drop of LP thread(s) under HPAL operation

| Number of threads | % IPC drop in LP thread(s) |
|---|---|
| 2 | 36.4% |
| 4 | 29.1% |

The IPC numbers for the LP thread(s) drop by a significant amount in the HPAL policy because their performance is completely sacrificed in favour of the HP thread. However, there is some improvement in the IPC of the LP threads in the four thread model (relative to the two thread model) since there are three LP threads running at the same time, which increases the likelihood of LP thread progress.

Finally, the aggregate IPC numbers for all threads are shown in Table 3. The percentage IPC drop using the HPAL scheme is calculated relative to the aggregate IPC of the baseline MT model.

TABLE 3

Aggregate Instructions Per Cycle drop under HPAL operation

| Number of threads | % aggregate IPC drop |
|---|---|
| 2 | 4.1% |
| 4 | 3.2% |

It can be seen that the LP threads are performing so badly that the total IPC of the MT model using the HPAL scheme is below the total IPC of the baseline MT model. When four threads are executing the aggregate IPC improves compared to when two threads are executing because the overall LP thread progress is faster. Overall the HPAL policy gives the best HP-thread performance by its extreme protective behaviour of the HP thread lines. The HPAL policy represents the upper limit for performance of the HP thread.

Next, the same results are presented for the collision tag scheme (i.e. that illustrated in FIG. 6). The same test configuration as above was used to get the results.

TABLE 4

Speed up in HP thread under collision tag policy

| Number of threads | % speed up in HP thread |
|---|---|
| 2 | 3.7% |
| 4 | 5.8% |

TABLE 5

Instructions Per Cycle drop of LP thread(s) under collision tag policy

| Number of threads | % IPC drop in LP thread(s) |
|---|---|
| 2 | 15.4% |
| 4 | 10.3% |

TABLE 6

Aggregate Instructions Per Cycle drop under collision tag policy

| Number of threads | % aggregate IPC drop |
|---|---|
| 2 | 1.7% |
| 4 | 1.6% |

As can be seen from Table 4, the HP thread speed up is smaller than the HP thread speed up using the HPAL policy. This is because the collision tag scheme specifically only protects formerly evicted HP cache lines rather than protecting all HP cache lines. Thus, some HP thread execution time is sacrificed. The sacrifice improves the LP thread progress (as shown in Table 5) by a significant amount bringing the IPC drop down to nearly 10% for the four thread model from 29% in the four thread model using the HPAL policy. This then translates into the aggregate IPC numbers in Table 6, and the drop in aggregate IPC is noticeably smaller than compared to the HPAL scheme. The figures are approaching the baseline MT model.

Figure 11:
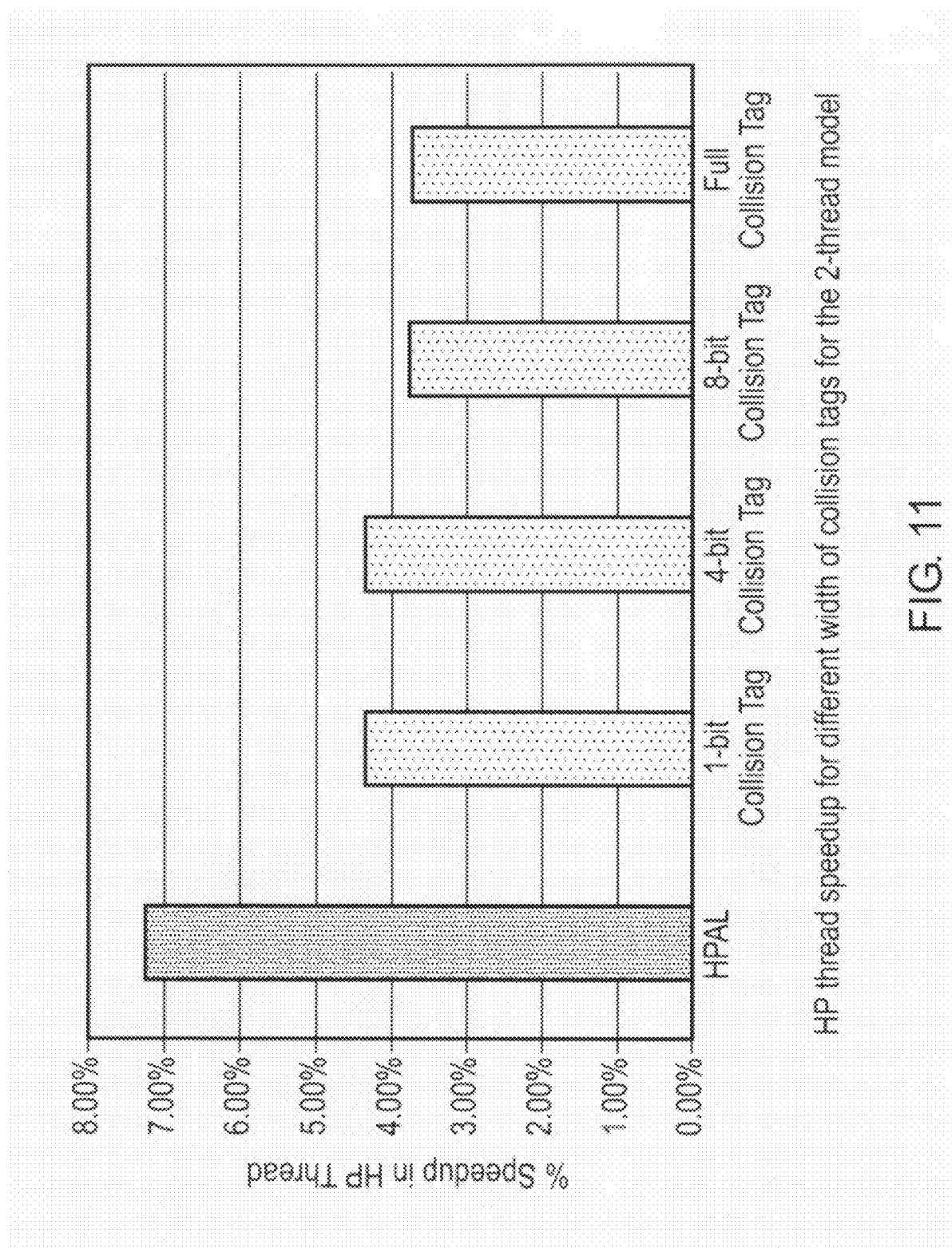
FIG. 11 presents example results of high priority thread speed up for different tag widths stored as history information.
Figure 12:
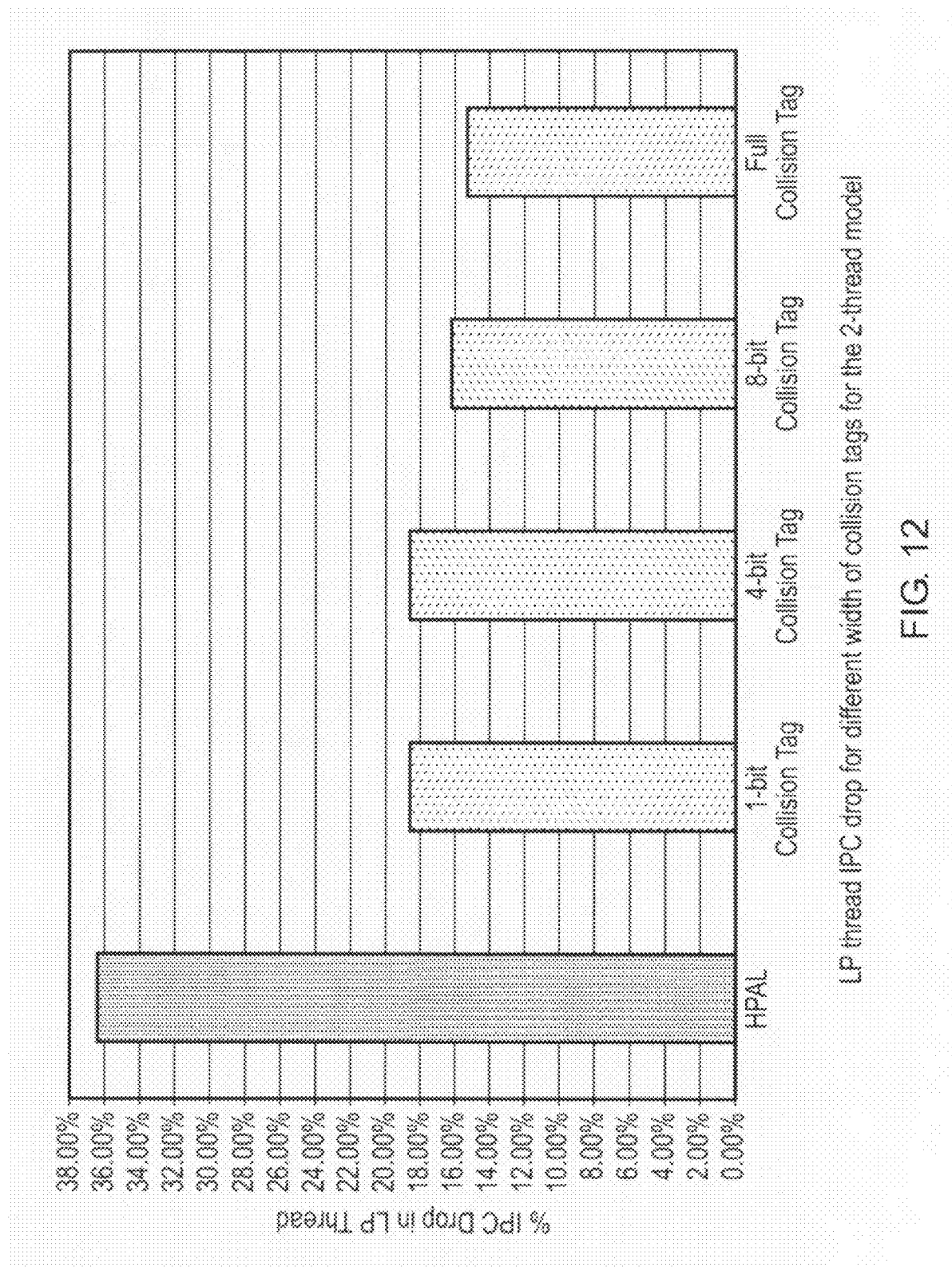
FIG. 12 illustrates example results for lower priority thread IPC drop for different tag widths stored as history information.
Figure 13:
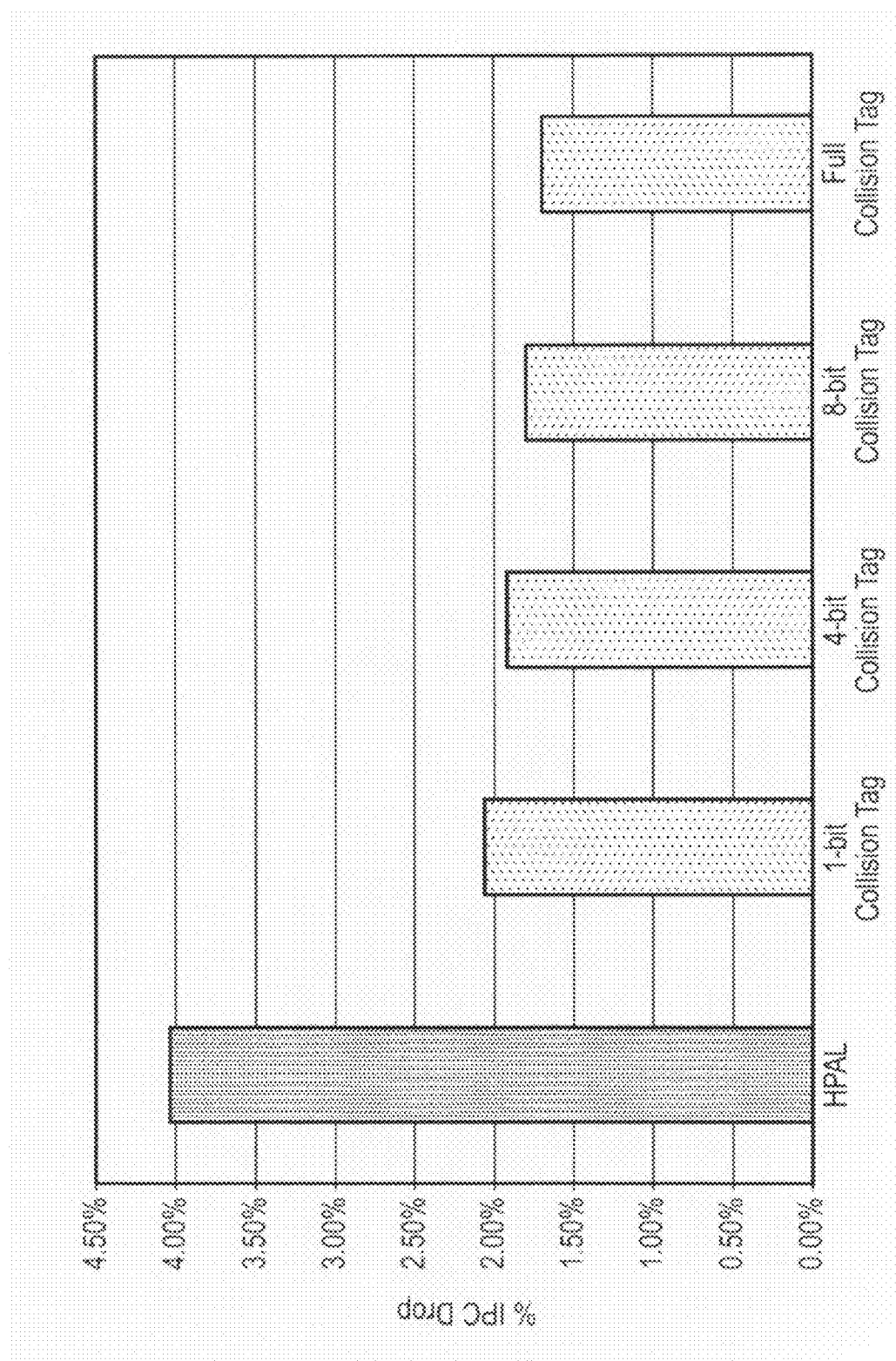
FIG. 13 presents example results for aggregate IPC drop for different tag widths stored as history information.

As mentioned earlier, in one embodiment of the present invention less than the full tag portion of evicted HP cache lines may be stored. Indeed, it has surprisingly been found that storing as little as one bit of the tag portion can result in improved overall system performance as is illustrated in FIGS. 11, 12 and 13. These figures show the collision tag width varying between 1-bit, 4-bit, 8-bit and full bit portions of the tag for the 2-thread model. The HPAL policy is also shown for comparison. It can be seen in FIG. 11 that there is in fact little difference in the HP thread speed up whatever size of collision tag is stored and indeed using only a single bit provides the best speed up as it results in the highest number of false positives (i.e. identifications of allocated cache lines associated with an HP thread as matching the history field, when in fact that history field was stored by a different cache line, which happens to have the same history field) when comparing to the tag portion of incoming HP cache lines. Turning to FIG. 12 it can be seen that the LP thread IPC drop also does not vary greatly depending on the width of the collision tag stored. Finally, turning to FIG. 13 it can be seen that the aggregate IPC drop is only slightly worse for the one bit collision tag than for the full collision tag. The full collision tag is in fact only 0.3 percentage points better than the 1 bit collision tag.

Thus, as observed in FIGS. 11 to 13, the difference in performance is negligibly small between the 1-bit collision tag and the full bit collision tag policies. However, the 1-bit collision tag policy has significant energy saving advantages due to its small area overhead over the full collision tag policy.

Finally, for overall comparison the results for the three metrics for the HPAL and collision bit vector policies are shown in Tables 7 to 9 as the total number of threads increases from 2 to 4 (i.e. the number of LP threads increases from 1 to 3).

TABLE 7

Speed up in HP thread

| Number of threads | HPAL | Collision Bit Vector |
|---|---|---|
| 2 | 7.3% | 4.4% |
| 4 | 12.1% | 7.6% |

TABLE 8

Instructions Per Cycle drop of LP thread(s)

| Number of threads | HPAL | Collision Bit Vector |
|---|---|---|
| 2 | 36.4% | 18.5% |
| 4 | 29.1% | 14.6% |

TABLE 9

Aggregate Instructions Per Cycle drop

| Number of threads | HPAL | Collision Bit Vector |
|---|---|---|
| 2 | 4.1% | 2.1% |
| 4 | 3.2% | 1.8% |

The main observation from these tables is that as the number of LP threads increases the gap in the HP thread performance between the HPAL and collision bit vector widens in favour of HPAL. As there are more LP threads in the system the HP thread's data is more vulnerable to evictions from the LP thread, hence HPAL performs quite well by providing unconditional protection to the HP thread cache lines.

It is also true that more LP threads provide better LP thread performance in both policies. Even the LP thread performance is improved in the HPAL policy because other LP threads are able to progress when some LP threads stall due to the over protection mechanism. As the number of LP threads increases the gap in the IPC drop of the LP thread is getting smaller.

The overall effect of these two factors is that the gap in aggregate IPC drop closes as the number of LP threads increases. Hence it is for this reason that, in one embodiment, when the number of LP threads is low in the system the collision bit vector policy is enabled. Then, when the number of LP threads increases in the system, a decision can be made by the operating system to switch from the collision bit vector policy to the HPAL mode of operation. As described previously, switching to HPAL mode is easily done by setting the corresponding HP bit and lock bit simultaneously as soon as an HP cache line is allocated into the cache.

Hence, according to the techniques of the present invention a data processing apparatus comprising processing circuitry for executing multiple program threads may make improved use of a storage unit shared between the multiple program threads. The inventors of the present invention realised that not every LP/HP interthread conflict in a shared storage unit is pathological, i.e. not every eviction of an HP thread entry from the shared storage unit by an LP thread entry will have a negative impact on the performance of the HP thread. By providing history information, in embodiments of the present invention as little as a single bit of history information, relating to HP thread entries evicted from the storage unit, HP thread entries need no longer be blindly protected and are only protected if they return to the storage unit soon after they are evicted. This approach has been shown to result in improved overall system performance (balancing the requirements of HP and LP threads), whilst requiring a modest increase in area (e.g. chip real estate) and energy expenditure.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus comprising:
   processing circuitry for executing multiple program threads including at least one high priority program thread and at least one lower priority program thread;
   at least one storage unit shared between the multiple program threads and comprising multiple entries, each entry for storing a storage item for reference by the processing circuitry when executing said program threads, each storage item being either a high priority storage item associated with said at least one high priority program thread or a lower priority storage item associated with said at least one lower priority program thread;
   history storage for retaining a history field for each of a plurality of blocks of the storage unit, each block comprising one or more of said entries; and
   control circuitry for, on detection of an evicted high priority storage item being evicted from an entry of the storage unit as a result of allocation to that entry of an allocated lower priority storage item, populating the history field for the block containing that entry with an indication of the evicted high priority storage item, and the control circuitry being further for performing, when an allocated high priority storage item is allocated to a selected entry of the storage unit, a comparison operation between the allocated high priority storage item and the indication in the history field for the block containing the selected entry, and on detection of a match condition said control circuitry setting a lock indication associated with said selected entry to inhibit further eviction of said allocated high priority storage item.

2. A data processing apparatus as claimed in claim 1, wherein said storage unit has a priority indication associated with each entry, for each entry said priority indication indicating whether the storage item in that entry is a high priority storage item or a lower priority storage item.

3. A data processing apparatus as claimed in claim 1, further comprising a lock indication storage unit for storing the lock indication associated with each entry.

4. A data processing apparatus as claimed in claim 1, wherein each block comprises a plurality of entries forming a set in the storage unit.

5. A data processing apparatus as claimed in claim 1, wherein said indication in said history field is derived from a static value within said evicted high priority storage item.

6. A data processing apparatus as claimed in claim 5, wherein said static value is an address portion of said evicted high priority storage item.

7. A data processing apparatus as claimed in claim 5, wherein said static value is a tag portion of the address of said evicted high priority storage item.

8. A data processing apparatus as claimed in claim 5, wherein said static value is a tag bit of a tag portion of the address of said evicted high priority storage item.

9. A data processing apparatus as claimed in claim 1, wherein said comparison operation comprises comparing at least one bit of said allocated high priority storage item with at least one bit of the indication in the history field for the block containing the selected entry.

10. A data processing apparatus as claimed in claim 1, wherein said match condition comprises at least one bit of said allocated high priority storage item being identical to at least one bit of the indication in the history field for the block containing the selected entry.

11. A data processing apparatus as claimed in claim 1, wherein said storage unit is a cache.

12. A data processing apparatus as claimed in claim 1, wherein said storage unit is a branch target buffer.

13. A data processing apparatus as claimed in claim 1, wherein said storage unit is a translation lookaside buffer.

14. A data processing apparatus as claimed in claim 1, wherein said storage unit is a set-associative storage unit.

15. A data processing apparatus as claimed in claim 1, wherein said storage unit is a direct-mapped storage unit.

16. A data processing apparatus as claimed in claim 1, wherein said processing circuitry comprises a multi-threaded processor core.

17. A data processing apparatus as claimed in claim 1, wherein said processing circuitry comprises multiple processor cores, each processor core executing at least one program thread.

18. A data processing apparatus as claimed in claim 1, wherein said processing circuitry is configured, when the number of lower priority threads being executed exceeds a predetermined value, to issue a control signal to cause said control circuitry to set said lock indication for every allocated high priority storage item.

19. A data processing apparatus as claimed in claim 18, wherein said control signal further causes said control circuitry to deactivate population of the history field for each of said plurality of blocks of the storage unit.

20. A data processing apparatus as claimed in claim 1, wherein said control circuitry applies an eviction algorithm to determine a victim entry to be the selected entry into which a new storage item is allocated and is arranged to select preferentially the victim entry from amongst entries whose associated lock indication is not set.

21. A method of managing at least one storage unit in a data processing apparatus, said data processing apparatus comprising processing circuitry for executing multiple program threads including at least one high priority program thread and at least one lower priority program thread, said at least one storage unit being shared between the multiple program threads and comprising multiple entries, each entry for storing a storage item for reference by the processing circuitry when executing said program threads, each storage item being either a high priority storage item associated with said at least one high priority program thread or a lower priority storage item associated with said at least one lower priority program thread, said method comprising the steps of:

retaining a history field for each of a plurality of blocks of the storage unit, each block comprising one or more of said entries;

detecting an evicted high priority storage item being evicted from an entry of the storage unit as a result of allocation to that entry of an allocated lower priority storage item;

on said detection populating the history field for the block containing that entry with an indication of said evicted high priority storage item; and when an allocated high priority storage item is allocated to a selected entry of the storage unit, performing a comparison operation between the high priority storage item and the indication in the history field for the block containing the selected entry, and on detection of a match condition setting a lock indication associated with said selected entry to inhibit further eviction of said allocated high priority storage item.

22. A data processing apparatus comprising:

processing means for executing multiple program threads including at least one high priority program thread and at least one lower priority program thread;

at least one storage means shared between the multiple program threads and comprising multiple entries, each entry for storing a storage item for reference by the processing means when executing said program threads, each storage item being either a high priority storage item associated with said at least one high priority program thread or a lower priority storage item associated with said at least one lower priority program thread;

history storage means for retaining a history field for each of a plurality of blocks of the storage unit, each block comprising one or more of said entries; and control means for, on detection of an evicted high priority storage item being evicted from an entry of the storage means as a result of allocation to that entry of an allocated lower priority storage item, populating the history field for the block containing that entry with an indication of the evicted high priority storage item, the control means being further for performing, when an allocated high priority storage item is allocated to a selected entry of the storage means, a comparison operation between the allocated high priority storage item and the indication in the history field for the block containing the selected entry, and on detection of a match condition said control means setting a lock indication associated with said selected entry to inhibit further eviction of said allocated high-priority storage item.

* * * * *